United States Patent [19]

Olinger et al.

[11] 4,374,762
[45] Feb. 22, 1983

[54] PROCESS FOR THE REMOVAL OF TRITIUM FROM THE PRODUCT SOLUTIONS OBTAINED BY THE PUREX PROCESS

[75] Inventors: Rainer Olinger, Hagen; Andre van den Bossche, Werl, both of Fed. Rep. of Germany

[73] Assignee: Uhde GmbH, Dortmund, Fed. Rep. of Germany

[21] Appl. No.: 156,358

[22] Filed: Jun. 4, 1980

[30] Foreign Application Priority Data

Jun. 10, 1979 [DE] Fed. Rep. of Germany ....... 2929167

[51] Int. Cl.³ .................... C01F 13/00; C01F 15/00
[52] U.S. Cl. ................................. 252/631; 423/249
[58] Field of Search ............... 423/249, 251, 4, 8, 423/19, 20; 252/627, 631

[56] References Cited

U.S. PATENT DOCUMENTS

| | | | |
|---|---|---|---|
| 3,357,802 | 12/1967 | Anderson | 423/251 |
| 3,374,068 | 3/1968 | Elandson et al. | 423/4 |
| 3,836,625 | 9/1974 | Schäfer et al. | 252/627 |
| 3,954,654 | 5/1976 | Bernard | 423/249 |
| 4,011,296 | 3/1977 | Ruiz et al. | 423/8 |

Primary Examiner—Allan Lieberman
Attorney, Agent, or Firm—Wilson, Fraser, Barker & Clemens

[57] ABSTRACT

A process for the removal of tritium from the product solutions obtained in the reprocessing of irradiated nuclear fuels by the Purex process comprising a plurality of series-connected extraction cycles having an organic solvent.

7 Claims, 3 Drawing Figures

PROCESS FOR THE REMOVAL OF TRITIUM FROM THE PRODUCT SOLUTIONS OBTAINED BY THE PUREX PROCESS

BACKGROUND OF THE INVENTION

DE-AS 24 23 793 teaches a process wherein a special scrubbing step is intercalated at a certain point in the first extraction cycle with the aim of minimizing the quantity of water containing the major quantity of tritium. The residual quantities of tritium are ignored in this process and emitted into the environment.

According to the stringent statutory regulations, the results obtained by said known process are not satisfactory. The degree of environmental pollution with this known process may be above the statutory limits. Moreover, the function of the entire process depends on the efficiency and functionability of a single plant section, namely the additional scrubbing step.

SUMMARY OF THE INVENTION

The aim of the invention is to find a relatively simple and economical method for classifying and purifying the effluents from an entire process to an extent that satisfies the stringent statutory regulations while minimizing the quantity of waste water containing tritium, which waste water has to be stored in a place for the final disposal of nuclear waste.

This aim is realized according to the invention by providing a plurality of intermediate cycles for the purification of the aqueous phase.

By intercalating special cycles for the aqueous phase, the purification effect achieved with the aid of the invention is particularly favorable, because the multiplication of the purification effect according to the known Purex process is also achievable as regards the pollutant tritium. A particular effect achieved by this configuration is that the concentration of tritium, which is obtained in each and every cycle, is not maintained as high as possible, but by discharging large quantities of water and nitric acid the tritium concentration is kept at a reasonable low level in each cycle.

According to an embodiment of the invention, an intermediate aqueous-phase purification cycle is arranged downstream of each solvent cycle, thereby facilitating standardization of equipment within the plant and this, in turn, constituting economization of the process in that a plurality of similar assemblies can be arranged in series and/or parallel.

With the process according to the invention it is also possible to provide separate intermediate purification cycles for Pu and U after the Pu/U separation step, as a result of which the total number of items of equipment can be reduced, because the separation ability and, consequently, the purification ability of the two products differ, which means that the process which requires more sophisticated equipment can be operated with smaller volumes of chemicals and other auxiliary materials, i.e., altogether more economically. This does not preclude the entirety of the purification cycles being arranged upstream of the Pu/U separation step, if this should prove to be more economical in a particular case.

With the process according to the invention it can also be expedient partly to recombine the intermediate aqueous-phase purification cycles. This presents advantages, particularly in such cases when the required purification effect can be achieved with a relatively small number of purification cycles.

A further embodiment of the invention serves for minimizing the tritium quantities in each cycle, in that predetermined quantities of tritium are removed from each intermediate purification cycle.

Another advantageous embodiment of the invention serves to improve the overall efficiency of the entire process and provides for the fluids, removed from an intermediate cycle being returned to the preceding cycle, i.e., the more contaminated process step. As a result of this procedure, any make-up chemicals, water, etc. required to maintain the mass and utilities balance can be fed to the final, i.e., the least contaminated, intermediate purification cycle.

To simplify process control as well as the process itself, the invention provides for an optional addition into each intermediate purification cycle of fresh nitric acid and/or water in the form of other chemical solutions typical of the process. These additional fluids are not contaminated with tritium and therefore have no adverse effect on the process.

According to a further embodiment of the invention, the refined stream from the Pu extraction stage downstream of the Pu/U separation stage is returned as scrubbing fluid into the last scrubbing step of the Pu/U extraction stage. This embodiment allows the process configuration to be greatly simplified.

In order to improve the purification effect of the intermediate purification cycles further still, another embodiment of the invention provides for additional quantities of acid and water being removed from one or more intermediate aqueous-phase purification cycles, these removed quantities being used as scrubbing solutions for purification stages of the organic phase.

BRIEF DESCRIPTION OF THE DRAWINGS

In the following, the invention is described in more detail with the aid of the drawings, where.

The inscriptions in the different boxes of the block diagrams, each box representing a process step, have the following meanings (in alphabetical order):

A = Feed adjustment of the aqueous process solutions
Au = Dissolving of the fuel elements
D = Separation of the aqueous phase by distillation
E = Extraction
R = Reextraction
T = U/Pu separation
V = Evaporation of the aqueous phase
W = Scrubbing of the organic phase.

DESCRIPTION OF THE PREFERRED EMBODIMENT

Figure 1:
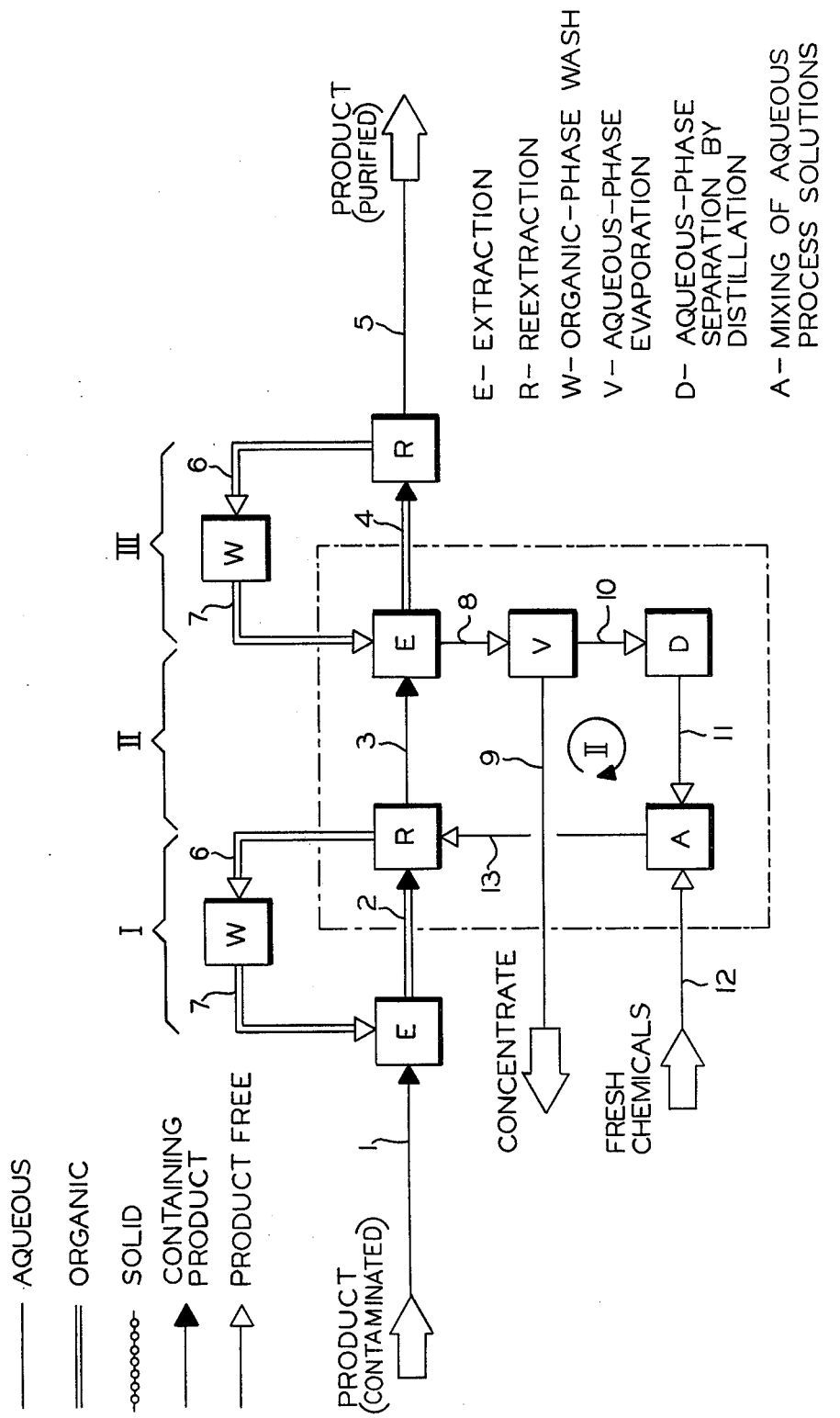
FIG. 1 represents a block diagram of an aqueous-phase intermediate purification cycle.

FIG. 1 is the block diagram of a process in which an organic cycle I is followed by an aqueous cycle II and this is, in turn, followed by an organic cycle III which is essentially identical with the organic cycle I. The product, e.g., uranium or plutonium or a uranium/plutonium mixture, enters the process via path 1. It is mixed with an organic solvent in the extraction step E and extracted, fed to the reextraction step R via path 2, then via path 3 to another extraction step E and then via path 4 to another reextraction step R. The purified product leaves the process via path 5. Further extraction cycles can be connected downstream, but this is not shown in FIG. 1. The organic phase is fed from the reextraction step R via path 6 to a scrubbing step W and thence via 7 to the extraction step E.

The aqueous-phase purification process is enclosed in FIG. 1 by a dot-dash line. This purification cycle II is arranged between the two cycles I and III. The aqueous phase is withdrawn via path 8 from the extraction step E and fed to an evaporation step V, from where concentrate is removed via path 9. The evaporation step V is followed via path 10 by a distilling step D for separating the aqueous phase which then flows via path 11 to the mixing step A. Fresh chemicals can be introduced here via path 12. The aqueous phase is then returned via path 13 to reextraction step R.

Such a sequence of extraction cycles I and III with intermediate aqueous-phase purification cycles II can be interconnected in different ways, as illustrated by the following examples.

Figure 2:
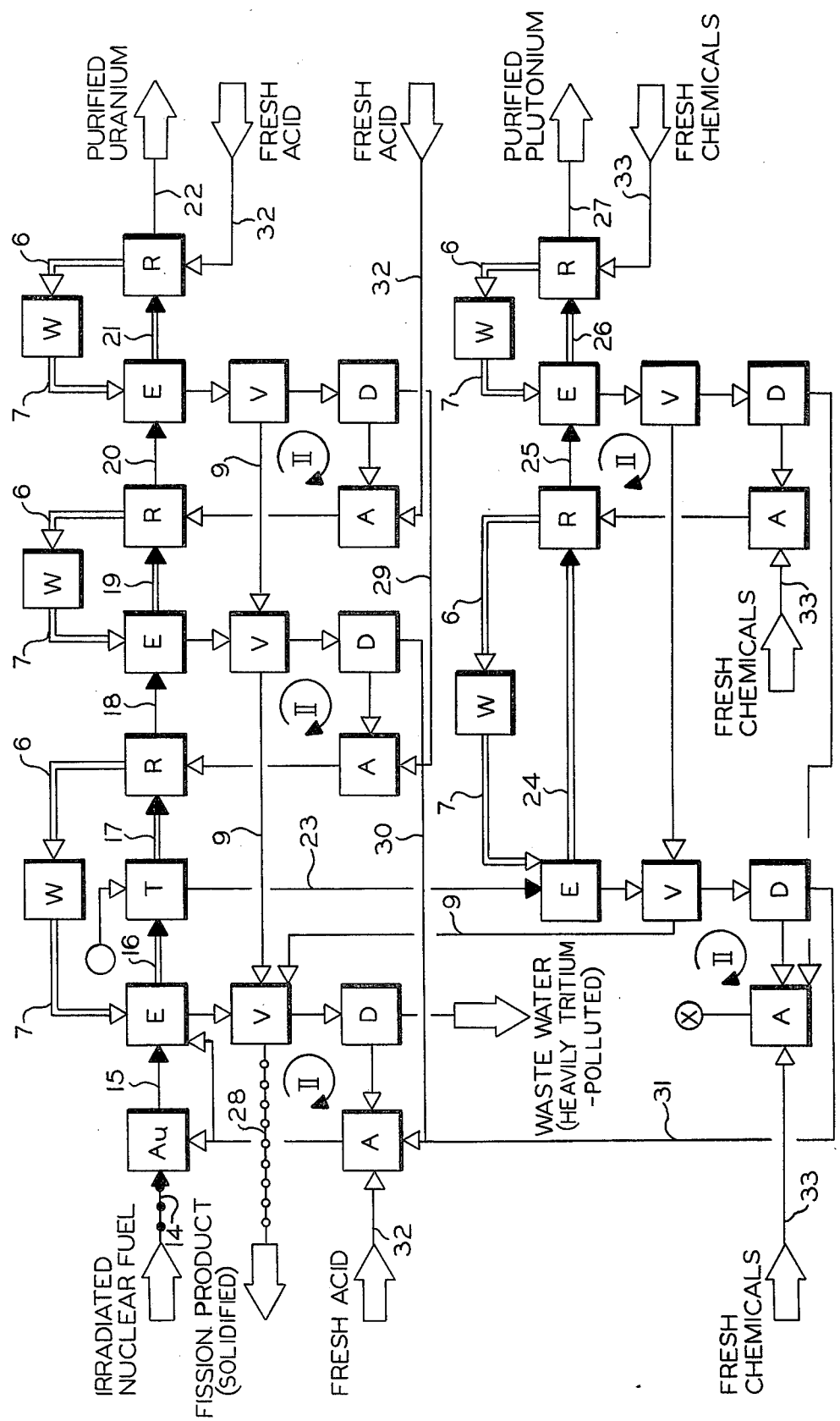
FIG. 2 represents a block diagram of a complete process according to the invention.

FIG. 2 is the block diagram of the entire process according to the invention. The irradiated nuclear fuel to be treated enters the process via path 14 and is subjected to dissolving in Au. It is then fed, still as a U/Pu mixture, via path 15 to the extraction step E and, from there, via path 16 to a separation step T. In the example shown, the uranium portion then flows via path 17 into a reextraction step, via path 18 into the next extraction step, path 19 into the next reextraction step, path 20 into another extraction step and path 21 into yet another reextraction step, to leave the process via path 22 as purified uranium.

The plutonium portion of the nuclear fuel leaves the U/Pu separation step T via path 23 and is fed into an extraction step E, from there via paths 24, 25 and 26 through a reextraction, extraction and reextraction step, respectively, to leave the process as purified plutonium via path 27.

Solvent scrubbing steps W for the organic phase are arranged in countercurrent between the respective reextraction and extraction steps, as described in FIG. 1, the respective paths being marked 6 and 7, likewise as per FIG. 1.

Significant for the invention are the intermediate aqueous-phase purification cycles II, the symbol II allotted to each such cycle being enclosed by a circular arrow. In order not to impair the clarity of the illustration, the paths within the intermediate purification cycles, which correspond in principle to the paths shown in FIG. 1, are left unmarked.

As can be seen in FIG. 2, the concentrate from any evaporation step V is fed via path 9 to the evaporation step V of the upstream, i.e., the more contaminated, cycle, to leave the process as fission product via path 28, possibly in compacted, vitrified or similar state. Moreover, FIG. 2 also features the possibility to feed back the product from any distillation step D to the mixing step A of the upstream, i.e., more contaminated, step via paths 29, 30 and 31, respectively.

Fresh acid is introduced into the process via paths 32, paths 33 serving for the feed of fresh chemicals, especially in the plutonium purification section.

The intermediate purification cycle II is interrupted for reasons of illustration at the U/Pu separation step T, the point of interruption being marked by an encircled x. In practice, the two points x/x are an uninterrupted connection.

Figure 3:
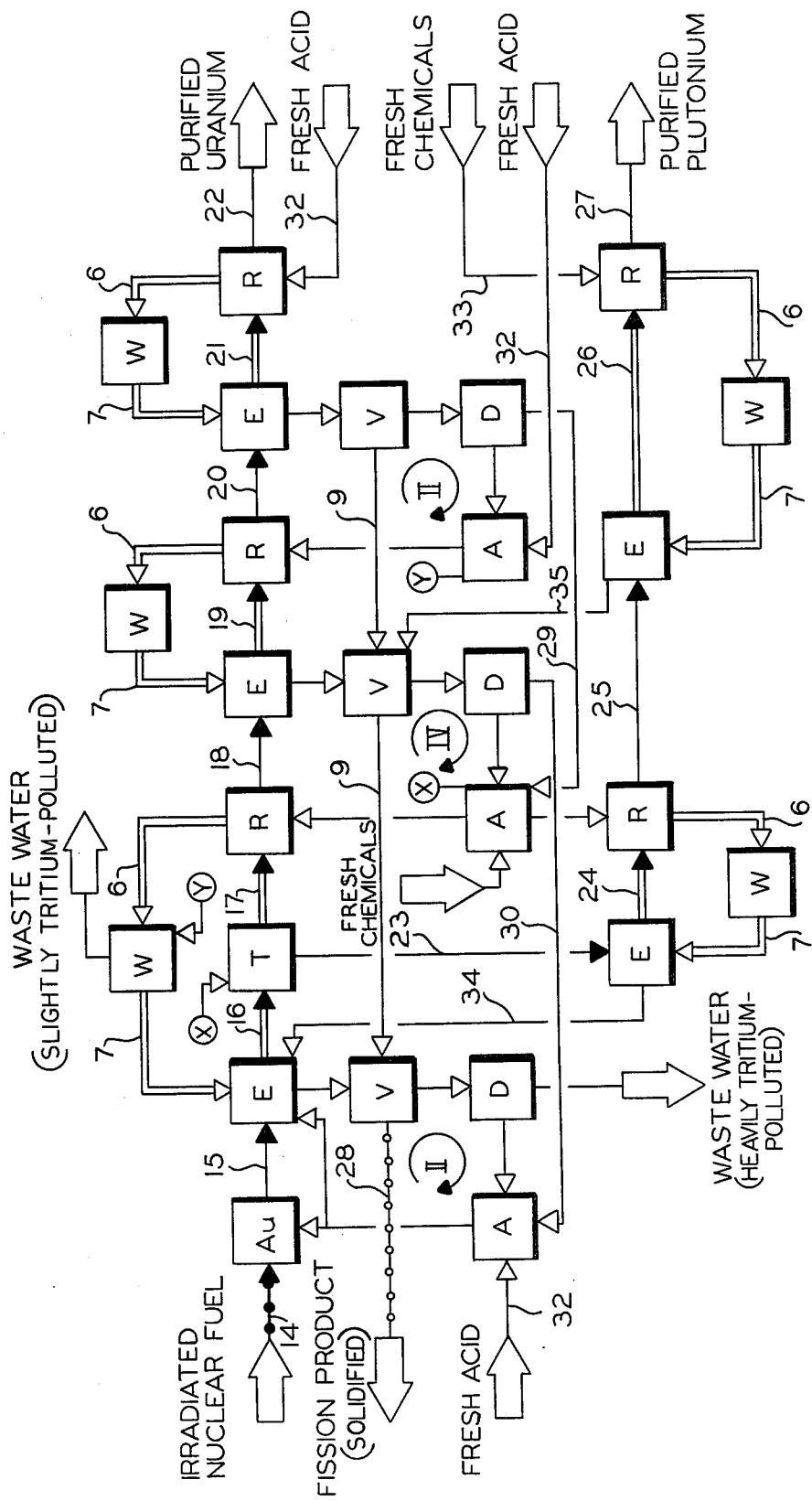
FIG. 3 is the block diagram of a modified example according to the invention.

A further advantageous embodiment of the invention is illustrated in FIG. 3, in which the same designations are used as in FIGS. 1 and 2. It can be seen that the first intermediate purification cycle II, shown on the left of FIG. 3, is simultaneously the intermediate purification cycle of the first extraction cycle of the Pu line downstream of the separation step, the connecting link being path 34.

The middle intermediate purification cycle, for reasons of clarity marked IV, i.e., the intermediate purification cycle intercalated between the cycle bridging the separation step on the one side and the first extraction cycle of the uranium line on the other side, simultaneously serves as the intermediate purfication cycle of the last extraction cycle of the plutonium line, the connecting link being 35.

In order not to impair clarity, two paths have been interrupted in FIG. 3. The two points x should be interconnected, as should the points y.

As can be seen from the above description, the effectiveness of the process according to the invention comprises the fact that a plurality of intermediate purification cycles II are provided for the aqueous phase. The quantity of tritium still present at the end of the uranium line, for instance, can be reduced by the process according to the invention to less than one millionth part of the original quantity contained in the influent, i.e., in the solution contaminated most.

It goes without saying that the examples quoted can be modified in a multitude of ways without deviating from the fundamental idea of the invention. Thus, the invention is not limited to the illustrated number of extraction and intermediate aqueous-phase purification cycles, nor is it limited to the intermediate purification cycles being provided mainly after separation into the two product lines, it being equally feasible to subject the product to such multiple purification prior to separation. Depending on the nature of optimization of the individual processes, different quantities of fresh acid or chemicals can be fed to the individual steps in the same way as different quantities of tritium or similar substances can be withdrawn from these steps.

We claim:

1. A method for the removal of tritium from a product solution obtained in the reprocessing of irradiated nuclear fuel by the PUREX process, said method comprising the steps of subjecting a plurality of aqueous solutions of the product to a plurality of successive extractions with a water-immiscible solvent to produce a plurality of successively less contaminated solutions of the fuel in the water-immiscible solvent and a plurality of aqueous tritium extracts, separating each of the immiscible solvent solutions from its associated tritium extract, subjecting a plurality of the immiscible solvent solutions of the fuel to re-extraction to produce the aqueous solution of the fuel which is subjected to each of the next successive extractions, purifying a plurality of the aqueous tritium extracts, and using the tritium extract separated from one of the immiscible solvent solutions and purified to re-extract the next more contaminated immiscible solvent solution.

2. A method for the removal of tritium from a combined uranium/plutonium irradiated fuel, which method includes the steps of separating the irradiated uranium from the irradiated plutonium, and separately subjecting the irradiated plutonium and the irradiated uranium to the removal process claimed in claim 1.

3. A method as claimed in claim 1 or 2 wherein each tritium extract purification involves an evaporation step, and vapors from one of the evaporation steps are introduced into the evaporator for a tritium extract separated from a more highly contaminated fuel solution in a water-immiscible solvent.

4. A method as claimed in claim 3 wherein each tritium extract purification includes a distillation of the unevaporated portion of the extract, and wherein unevaporated extract from a distillation is mixed with distilled extract separated from a more highly contaminated fuel solution in a water-immiscible solvent.

5. A method as claimed in claims 1 or 2 wherein predetermined quantities of tritium are withdrawn during each of the purifying steps.

6. A method as claimed in claims 1 or 2 wherein fresh chemicals required for maintaining the mass and utilities balance are mixed with distilled extract separated from the least contaminated fuel solution in a water-immiscible solvent.

7. A method for the removal of tritium from an aqueous PUREX process product solution obtained in the reprocessing of irradiated nuclear fuel, which method includes the steps of circulating the aqueous product solution to a first solvent extraction stage; treating the product solution at the first extraction stage with an immiscible solvent to extract therefrom an organic solvent product solution, leaving an aqueous tritium extract; separating the aqueous tritium extract from the organic solvent solution; purifying the aqueous extract; circulating the organic solvent product solution from the first solvent extraction stage to a re-extraction stage; treating the solvent solution at the re-extraction stage to extract therefrom a second aqueous fuel product solution; circulating the second aqueous fuel product solution to a second solvent extraction stage; treating the second aqueous product solution at the second extraction stage with an immiscible solvent to extract therefrom an organic solvent product solution, leaving a second aqueous tritium extract; separating the second aqueous tritium extract from the second organic solvent solution; purifying the second aqueous extract; circulating the purified second extract to the first re-extraction stage; and using the purified second extract in the re-extraction stage as a solvent for the second aqueous fuel product solution.

* * * * *